(12) United States Patent
Cliffe

(10) Patent No.: US 12,217,034 B2
(45) Date of Patent: Feb. 4, 2025

(54) BUILD SYSTEM FOR SECURELY BUILDING AND DEPLOYING A TARGET BUILD ARTIFACT

(71) Applicant: Oracle International Corporation, Redwood Shores, CA (US)

(72) Inventor: Owen Christopher Cliffe, Bath (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 184 days.

(21) Appl. No.: 18/190,331

(22) Filed: Mar. 27, 2023

(65) Prior Publication Data
US 2024/0329953 A1 Oct. 3, 2024

(51) Int. Cl.
*G06F 8/41* (2018.01)
(52) U.S. Cl.
CPC .................... *G06F 8/433* (2013.01)
(58) Field of Classification Search
None
See application file for complete search history.

(56) References Cited

U.S. PATENT DOCUMENTS

| | | | | |
|---|---|---|---|---|
| 8,082,294 B2* | 12/2011 | Krahulec | | G06F 16/972 |
| | | | | 719/329 |
| 10,691,810 B1* | 6/2020 | Freitag | | G06F 8/71 |
| 11,150,895 B1* | 10/2021 | Wall | | G06F 8/65 |
| 2002/0087735 A1* | 7/2002 | Reinfelder | | G06F 9/4492 |
| | | | | 719/310 |
| 2017/0169229 A1* | 6/2017 | Brucker | | G06F 21/566 |
| 2022/0318396 A1* | 10/2022 | Deng | | G06F 21/577 |
| 2023/0281316 A1* | 9/2023 | Lewandowski | | G06F 21/577 |
| | | | | 726/22 |
| 2024/0168733 A1* | 5/2024 | Cherivirala | | G06F 16/185 |

OTHER PUBLICATIONS

Alqahtani, "Tracing known security vulnerabilities in software repositories—A Semantic Web enabled modeling approach", 2016, Elsevier (Year: 2016).*
Macho, "Automatically Repairing Dependency-Related Build Breakage", 2018, IEEE (Year: 2018).*

* cited by examiner

*Primary Examiner* — Hossain M Morshed
(74) *Attorney, Agent, or Firm* — Kilpatrick Townsend & Stockton LLP

(57) ABSTRACT

A build system is disclosed that identifies the inputs used by a build process for securely building and deploying a piece of software to production. The build system comprises a build container and a build proxy server. The build container receives a set of initial inputs for performing a build and generates a build output (e.g., a target artifact) as a consequence of performing the build. The build proxy server monitors both internal interactions as well as external interactions (e.g., input dependency fetches from external artifact repositories) of the build container within and outside a network boundary defined around the build container. Based on the monitored interactions, the build proxy server identifies all the additional input components and/or input component dependencies used by the build container for successfully performing the build. The build container uses the identified components to perform the build and generate a target artifact.

20 Claims, 9 Drawing Sheets

BUILD SYSTEM FOR SECURELY BUILDING AND DEPLOYING A TARGET BUILD ARTIFACT

BACKGROUND

A software supply chain comprises a set of processes and components used in a software development cycle for building and deploying a piece of software (e.g., an application, code, an application package, a file) to production. Software supply chain security refers to validating and verifying the processes and components used to construct a deployed piece of software. The attestation of the processes and components enables consumers of the deployed software (e.g., a deployed software artifact) to verify that each of the components and processes that were used to generate the deployed software can be traced to the inputs (e.g., tools, libraries, and events) that led to the construction of the deployed software. However, the security of the secure software supply chain may be compromised by attackers who can subvert the software supply chain by injecting malicious code into processes deep within the supply chain resulting in significant risk and cost to end-customers who use the software.

Existing approaches for managing the security of a software supply chain involve identifying, by a software build tool, the inputs that go into a build process for securely building and deploying the software and determining that the inputs come from verifiable and trustworthy sources. Due to the complexities of the software build process and the technologies involved in performing these builds, the identification of the inputs and the input dependencies that are provided to a build can be a challenging process. Currently, the identification of inputs and input dependencies (i.e., external artifacts) that influence the outcome of a build process is typically done manually. Some build tools use automated programs to identify the inputs, but both the manual and the currently used automated techniques suffer from several drawbacks. Certain input dependencies may inadvertently be left out, the dependencies that are identified may be incorrect or there may be hidden dependencies that cannot be identified manually or be identified using currently used automated processes. There is thus a need for developing improved techniques for securely building and deploying a target artifact in a software supply chain than what is possible by existing implementations.

BRIEF SUMMARY

This disclosure relates generally to techniques for identifying the inputs used by a build process for securely building and deploying a piece of software to production. More specifically, but not by way of limitation, the disclosure relates to techniques for identifying the specific inputs used by a build process by monitoring the interactions of a build system with various network endpoints located within and outside a network trust boundary associated with the build system.

In certain embodiments, a build system is disclosed. The build system receives a list of inputs for performing a build. Based on the list of inputs, the build system identifies one or more additional inputs for performing the build. The build system then transmits a request to establish connection to a network endpoint associated with the additional input. Upon determining that the connection to the network endpoint associated with the additional input is successful, the build system performs processing to determine that the additional input can be trusted. Responsive to determining that the additional input can be trusted, the build system adds the additional input to the list of inputs for performing the build and uses the additional input to perform the build. The build system then generates a target build artifact as a result of executing the build.

In certain examples, the additional input is not specified in the list of inputs for performing the build. The additional input may represent an additional input component, or an input component dependency used by the build system for performing the build. In certain examples, the additional input resides in a trusted repository located within a network trust boundary associated with the build system. In other examples, the additional input resides in an untrusted repository located outside a network trust boundary associated with the build system.

In certain examples, the build system replicates/downloads content associated with the additional input in a local data store associated with the build system upon determining that the additional input can be trusted. In a certain implementation, the local data store resides within a network trust boundary associated with the build system.

In certain examples, the build system determines that the network endpoint associated with the additional input resides outside a network trust boundary associated with the build system. Based on this determination, the build system then applies rules to determine that a repository that stores the additional input resides in is trustworthy. If the repository is determined to be trustworthy, the build system determines that the additional input can be trusted.

In certain examples, the build system determines that the network endpoint associated with the additional input resides inside a network trust boundary associated with the build system. Based on this determination, the build system determines that the additional input can be trusted.

In certain examples, the build system adds information identifying an additional input identifier, an additional input name, a dependency relationship of the additional input with one or more input component dependencies associated with the additional input and a name of the repository that stores the additional input to the list of inputs for performing the build.

In certain examples, the build system determines that the connection to the network endpoint associated with the additional input is unsuccessful and responsive to this determination, blocks all network traffic to the endpoint.

In certain examples, the build system re-executes the build based on the list of inputs and the one or more additional inputs identified and recorded in the original build and generates a target build artifact as a result of re-execution of the build. The build system additionally deploys the target build artifact to production.

In certain examples, prior to re-executing the build, the build system determines that content associated with the at least one additional input used to perform the build has changed and responsive to determining that the content has changed, stops or halts the re-execution of the build.

In a certain implementation, the build system comprises a build container for performing the build and a build proxy server for monitoring network communications to and from the build container. The build proxy server captures and identifies the additional inputs for performing the build by monitoring the network communications to and from the build container.

Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
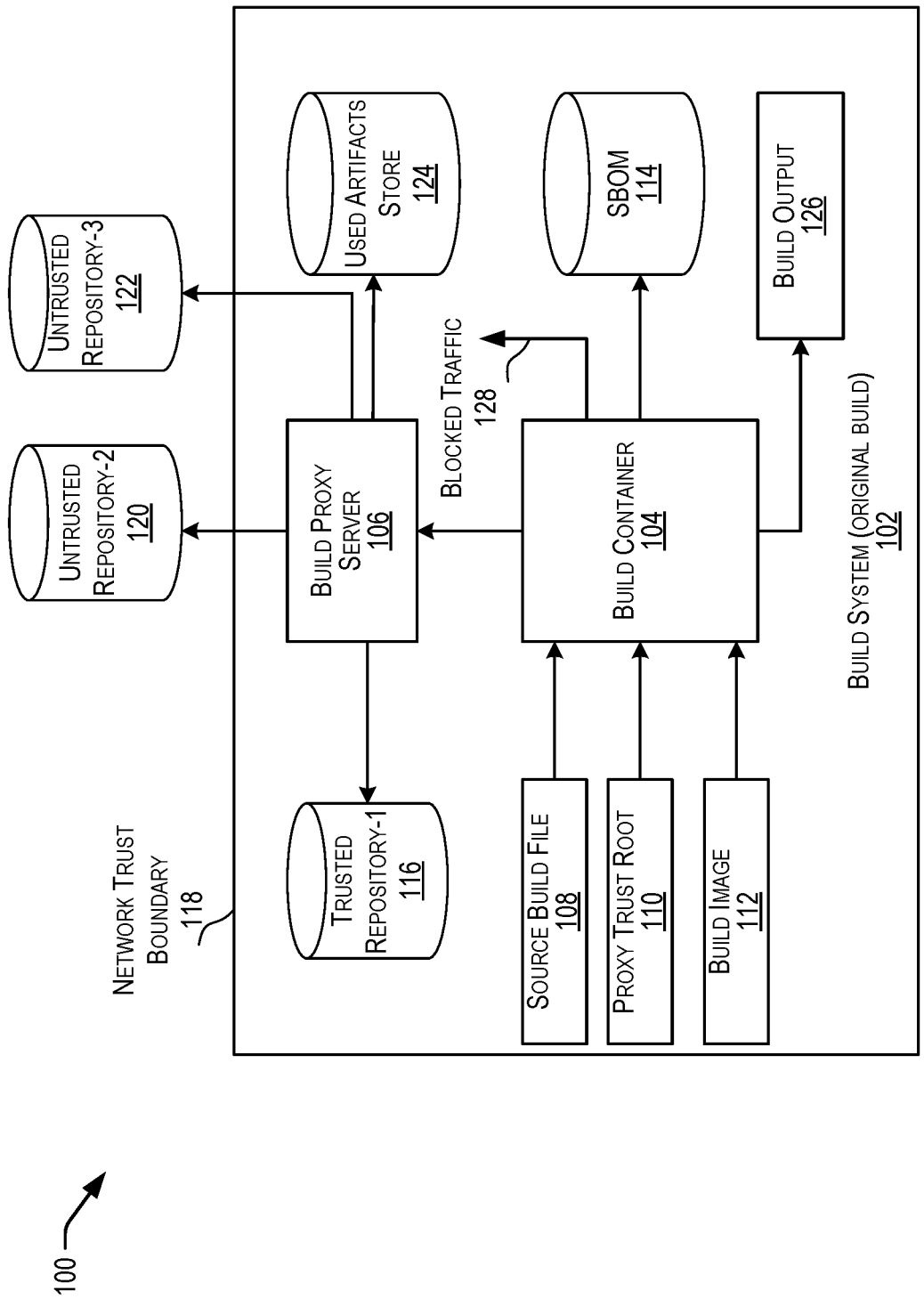
FIG. 1 depicts a computing environment of a build system that includes capabilities for identifying the inputs used to perform a build by monitoring the internal and external interactions of one or more components of the build system, according to certain embodiments.

This disclosure relates generally to techniques for identifying the inputs used by a build process for securely building and deploying a piece of software to production. More specifically, but not by way of limitation, the disclosure relates to techniques for identifying the specific inputs used by a build process by monitoring the interactions of a build system with various network endpoints located within and outside a network trust boundary associated with the build system.

As previously described, a challenge with existing software build tools is the ability of these tools to accurately capture the specific inputs and/or input dependencies used by a build process to produce a build output (e.g., a target artifact). Large parts of the software build input and input dependency identification process currently require the build process itself to be modified to be able to identify the inputs used by the build process, or the inputs have to be manually annotated to identify the inputs. Additionally, some existing build tools do not provide a model to capture their dependencies without first executing the build.

In certain approaches, the inputs to a build process may be identified by a build tool by inspecting the input dependencies identified in a build dependency file that provides a list of dependencies that can be used by a build process. However, external artifacts which may materially impact the output of a build cannot always be detected from a build dependency file. For example, when a build plug-in (an integration that extends the functionality of the build process) is used, the plug-in generally pulls its own dependencies and external artifact dependencies cannot be identified from a build dependency file. Additionally, certain dependencies (external artifacts) that influence the outcome of the build involve getting the artifacts from external repositories that are difficult to inspect. In some approaches, existing software tools may identify the input dependencies used by a build process inspecting a build configuration file (e.g., by parsing an XML file that contains information about configuration details used by the build process) or retrospectively inspecting the output of a build system to determine the input dependencies used by the build process. These techniques, however, rely on the assumption that the build tool (which is customer-controlled) resolves its dependencies in a predictable manner and these techniques are generally not robust.

The present disclosure describes improved techniques for identifying the inputs and/or input dependencies to a build process than what is possible by conventional techniques. In certain embodiments, a build system comprising a build container and a build proxy server is disclosed. The build container receives a set of initial inputs for performing a build (also referred to herein as a software build or a build process) and notionally computes a build output (e.g., a target artifact) as a consequence of executing the build. The build proxy server monitors both internal interactions as well as external interactions (e.g., input dependency fetches from external artifact repositories) of the build container in order to generate a software artifact and based on the monitored interactions, identifies all the components that are additional inputs (e.g., additional input components and/or input component dependencies) used by the build container for successfully performing the build. By continuously tracking both internal as well as external interactions (network communications) via network inspection, the build proxy server is able to identify and obtain an accurate and complete list of the additional inputs used by the build container for executing the build.

Rather than depending on source code inspection or build tools (that are generally used by conventional software build tools) to observe and identify all the inputs of a build, the disclosed build system includes capabilities to obtain a complete and accurate view of all the components that are additional inputs (e.g., additional input components and/or input component dependencies) used by the build container for successfully performing the build by intercepting and monitoring the network communications of the build container within and outside a network boundary defined around the build container. By continuously tracking the interactions of the build via network inspection, the disclosed build system is able to accurately track and identify additional input components and/or additional input dependencies residing in both internal repositories as well as external artifact repositories without making modifications to the build process and without performing complex inspection of the source code. Additionally, incorrectly identified inputs, inputs that can be potentially left out by manual inspection, and/or hidden input dependencies that cannot be identified manually or by using automated processes can be significantly reduced or even eliminated using the disclosed technique.

The accurate observation and recording of all the additional inputs used to perform an original build using the disclosed technique enables the build to be re-executed (validated) with a strong assumption around the stability of all the inputs provided to the build to generate a target artifact. In certain embodiments, the original build may be re-executed (i.e., repeated or validated) in a hermetically sealed environment based on the "observed" additional inputs that were captured, identified and recorded by the build system from the original build. A hermetically sealed (closed) environment refers to a self-contained build environment that does not have network access to endpoints located outside the build environment and does not depend on external artifacts or dependencies located outside of the build environment to execute the build and generate a target build artifact.

In certain embodiments, using the disclosed technique, an existing software build can easily be integrated with a repeatable build system and re-executed in a hermetically sealed environment to get all of the benefits of observable, repeatable builds, including high-quality dependency tracking and high levels of governance and observability over the software delivery lifecycle. Existing software build systems cannot easily be migrated to a hermetically sealed environment without significant human effort that typically involves making extensive modifications to the original build to preserve the desired properties of a hermetically sealed build. Using the disclosed technique, an original build can be re-executed in a hermetically sealed environment with few or no modifications to the original build using the observed additional inputs already captured, identified and recorded by the build system from the original build. The re-execution of the build in a hermetically sealed environment with a strong assumption around the stability of its inputs results in an attestable build that in turn can be used to mitigate the supply chain risk and enhance the security of the supply chain management process.

Referring now to the drawings, FIG. 1 depicts a computing environment 100 of a build system 102 that includes capabilities for identifying the inputs used to perform a build by monitoring the internal and external interactions of one or more components of the build system, according to certain embodiments. In the embodiment depicted in FIG. 1, the build system 102 comprises a build container 104 for performing a build (also referred to herein as a software build or a build process) and a build proxy server 106 for monitoring network communications to and from the build container. Based upon the monitored communications, the build proxy server 106 identifies all the components that represent additional inputs (e.g., additional input components and/or input component dependencies) used to perform the build. The build container 104 and the build proxy server 106 may be implemented by one or more computing systems that execute computer-readable instructions (e.g., code, program) to implement the build system. The systems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device).

Computing environment 100 depicted in FIG. 1 is merely an example and is not intended to unduly limit the scope of claimed embodiments. One of ordinary skill in the art would recognize many possible variations, alternatives, and modifications. For example, in some implementations, the computing environment 100 can be implemented using more or fewer systems and subsystems than those shown in FIG. 1, may combine two or more subsystems, or may have a different configuration or arrangement of subsystems.

The build system may 102 be implemented in various different configurations. In certain embodiments, the build system 102 may be implemented within an enterprise (organization) servicing users of the enterprise. For instance, users of an enterprise may utilize the monitoring functionality of the build system to identify all the components that are additional inputs (e.g., additional input components and input component dependencies) used to perform the build. In some other embodiments, the build system 102 may be implemented on one or more servers of a cloud service provider (CSP) and its functionality of monitoring the internal and external interactions (e.g., network communications) of the build container to identify all the additional inputs used by a build process may be provided to subscribers (e.g., an organization or an enterprise) who subscribe to cloud services on a subscription basis.

As depicted in FIG. 1, the build container 104 in the build system 102 receives a list of inputs (i.e., an initial list of build inputs) to perform a build. The list of inputs may include a source build file 108 which provides the source code and system configuration information for performing/executing the build, a proxy trust root 110 that identifies the location of a specific build proxy server (e.g., 106) used by the build system for monitoring network communications to and from the build container 104 and a build image 112 used by the build container 104 to execute the build. Based on the list of inputs (e.g., 108, 110, 112), the build container 104 executes the build to generate a build output 126 (e.g., a target build artifact). The target build artifact 126 may represent an application, code, an application package, a file and so on that is generated by the build container 104 as a result of executing the build. The build container 104 may be implemented using any software build tool (e.g., a docker container) that is configured to execute the build.

In certain examples, based on the list of inputs provided to the build container 104, the build container 104 identifies one or more components that are additional inputs for performing the build. The additional inputs may represent additional input components and/or input component dependencies used by the build container for successfully executing the build. For instance, a file 'A' specified in a source build file 108 may represent an additional input component used by the build container 104 for successfully performing the build. The input component dependencies may represent external artifacts (e.g., open source software components, additional files, links to system libraries, code, third-party dependencies and so on) used by the build container 104 to successfully generate the build output 126. The input component dependencies may not directly be specified and/or identified from the set of inputs (e.g., 108, 110, 112) provided to the build container. For instance, the input component dependencies may depend on the additional input components specified in the source file and influence the outcome of the build to successfully generate the build output (i.e., the target build artifact). By way of example, a file A (i.e., an additional input component) specified in the source build file 108 may specify header information identifying a link to a system library or to an open source file that is required by the additional input component A for successfully executing the build. This link/system library may represent an input component dependency (i.e., an external artifact) used by the build container 104 for successfully executing the build.

Based on the information specified in the source input file 108, and as part of executing the build process, the build container 104 may transmit multiple requests (also referred to herein as build input requests) to establish communication/connection with one or more network endpoints (e.g., an IP address or a port number) associated with one or more additional inputs (i.e., additional input components and/or input component dependencies) to perform the build. In a certain implementation, the requests from the build container 104 are intercepted by the build proxy server 106 which is configured to monitor the interactions of the build container 104 with various different network endpoints located within and outside a network trust boundary 118 defined around the build container. Based on the monitored interactions, the build proxy server 106 identifies an accurate and complete list of the additional inputs (i.e., additional inputs and input component dependencies) used by the build container 104 for executing the build.

In certain examples, the build proxy server 106 additionally performs processing to determine if the additional inputs associated with the network endpoints reside in verifiable and trustworthy data sources. Based on the processing, the build proxy server 106 adds the additional inputs to a list of build inputs used by the build container to perform the build process. In a certain implementation, the list of build inputs may be stored in a local data repository (e.g., a software bill of materials (SBOM) repository 114) associated with the build system 102. The SBOM repository 114 stores information identifying the initial list of build inputs (e.g., 108, 110, 112) used by the build system and all the additional inputs (i.e., additional input components and input component dependencies) used by the build container 104 for performing the build. Each additional input in the SBOM repository 114 may be identified by an additional input identifier, an additional input name, a dependency relationship of the additional input with one or more input component dependencies and the name of the repository that the additional input resides in. In certain examples, the build proxy server 104 may also download/replicate the content of one or more of the identified additional inputs to a used artifacts store 124 associated with the build system 102. Additional details of the processing performed by the build proxy server to identify and store content associated with the additional inputs for executing the build is described in FIG. 2.

The new and improved architecture of the disclosed build system comprising the build container and the build proxy server described in the present disclosure provides several technical advancements and/or improvements over conventional build systems. Rather than depending on source code inspection to observe and identify the inputs of a build, using the new and improved architecture of the disclosed build system, a complete and accurate view of all the components that are additional inputs (e.g., additional input components and/or input component dependencies) used by the build container for successfully performing the build can be identified by intercepting and monitoring the network communications of the build container within and outside a network boundary defined around the build container. Additionally, by continuously tracking both internal as well as external interactions via network inspection, incorrectly identified inputs, inputs that can be potentially left out by manual inspection, and/or hidden input dependencies that cannot be identified manually or by using automated processes can be significantly reduced or even eliminated using the disclosed technique.

The additional inputs used by the build system 102 to perform the build may reside in one or more repositories that are located within the network trust boundary 118 of the build system 102 or outside the network trust boundary 118 of the build system 102. In the embodiment depicted in FIG. 1, the repositories comprise a trusted repository 116 located within the network boundary 118 of the build system 102 and one or more untrusted repositories (120, 122) located outside the network boundary 118. However, in other embodiments, the trusted repository 116 may also be located outside the network boundary 118 of the build system 102. The build proxy server 106 thus includes capabilities for monitoring internal interactions of the build container 104 with repositories located within the trust boundary as well as external interactions of the build container 104 with repositories outside the network trust boundary of the build container 104 to obtain an accurate and complete list of all the additional inputs needed by the build container 104 to successfully execute the build.

In certain examples, the build proxy server 106 may be implemented as a standard HTTP proxy server. The build proxy server 106 can additionally be implemented using various different configurations. In certain examples, the build proxy server 106 can be explicit from the perspective of the build container 104. In the explicit mode of operation, the to and from communications from the build container 104 to the build proxy server 106 are set up via configuration settings in the build container 106. In this mode of operation, Internet Protocol (IP) forwarding tables or IP forwarding policies are set up in the build container 106 such that all traffic from the build container 104 is forwarded to the build proxy server 106 and incoming traffic to the build container 104 is routed via the build proxy server 106. In other examples, the build proxy server 106 can be transparent from the perspective of the build container 104. In the transparent mode of operation, the build container 104 is not configured with proxy settings. The build container 104 instead directly sends network traffic to the network endpoints (destination IP address and port numbers) of the additional inputs that it wants to connect to. The network sets the build proxy server as the default gateway to get traffic to the proxy server, and once it does, the proxy server intercepts it to identify the network endpoints that the build container wishes to interact with. Additional details related to the processing performed by the various systems and subsystems in FIG. 1 are described below with respect to the flowchart depicted in FIG. 2 and its accompanying description.

Figure 2:
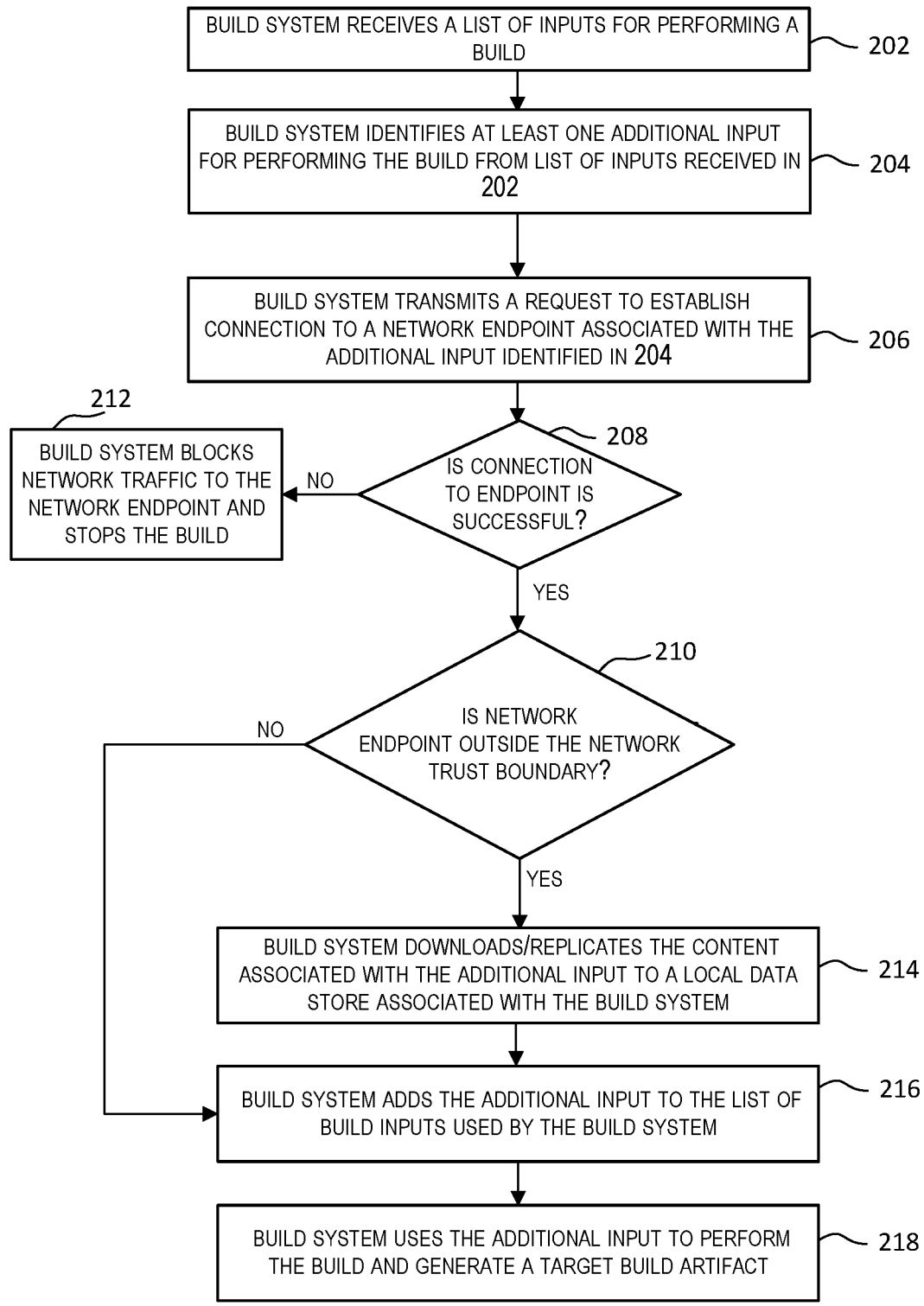
FIG. 2 depicts an example of a process performed by the build system within the computing environment depicted in FIG. 1, according to certain embodiments.

FIG. 2 depicts an example of a process 200 performed by the build system within the computing environment depicted in FIG. 1, according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 200 presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order, or some steps may also be performed in parallel. In certain embodiments, such as in the embodiment depicted in FIG. 1, the processing depicted in blocks 202-218 in FIG. 2 may be performed by one or more subsystems (e.g., the build container 104 and the build proxy server 106) of the build system 102.

At block 202, processing is initiated when the build container 104 receives a list of inputs for performing a build process. As previously described, in certain examples, the list of inputs may include the source build file 108 which provides the source code and system configuration information for executing the build, a proxy trust root 110 that identifies the location of a specific proxy server (e.g., 106) used by the build system 102 for monitoring network communications to and from the build container (e.g., 104) and a build image 112 used by the build container 104 to execute the build.

The processing depicted in blocks 204-218 and described below may be performed by one or more of the components (i.e., the build container 104 and the build proxy server 106) of the build system 102 for each additional input identified and used by the build container for performing the build. At block 204, the build container 104 identifies an additional input for performing the build. The additional input may represent an additional input component, or an input component dependency used by the build container 104 for executing the build. As described above, the build container 104, based on the information specified in an input (source input file 108) provided to the build container, and as part of executing the build process, may identify the additional input for performing the build.

At block 206, the build container 104 transmits a request (i.e., a build input request) to establish connection/communication with a network endpoint (e.g., an IP address or a port number) associated with the additional input identified in block 204.

At block 208, the request is intercepted by the build proxy server 106 which determines if the connection to the network endpoint can be successfully established. If the build proxy server 106 is unable to successfully establish connection to the network endpoint (e.g., due to unavailability of the endpoint or because it cannot determine the identity of the network endpoint), at block 212, the build proxy server 106 blocks all network traffic (e.g., 128 depicted in FIG. 1) to and from the network endpoint. Since the build proxy server 106 cannot determine the identity of the network endpoint, it cannot determine that the additional input associated with the network endpoint comes from a verifiable and trustworthy source and the build process is stopped.

If the connection to the network endpoint associated with the additional input can be successfully established, then, at block 210, the build proxy server 106 performs processing to determine if the network endpoint is located within or outside the network trust boundary (e.g., 118 depicted in FIG. 1) associated with the build system 102. If the network endpoint is located within the network trust boundary, at block 216, the build proxy server 106 tags/classifies the additional input as 'trusted' and adds the additional input to the list of build inputs represented in the SBOM repository 114 in the build system 102. In certain examples, as part of the processing performed in block 216, the build proxy server 106 may identify the repository that the additional input resides in, identify an originating logical coordinate of the additional input in the repository and a content address of the binary data and metadata read from the repository at the point the additional input (e.g., an additional input component and/or input component dependency) was read. For each additional input, the build proxy server 106 may also add the name of the repository that the additional component resides in, the location (logical coordinate and content address) of the additional input in the repository and the tag/classifier that identifies the additional input as 'trusted' to the SBOM repository 114.

If the network endpoint is located outside the network trust boundary (i.e., the additional input is a third party binary dependency or a library residing in an untrusted repository), at block 214, the build proxy server 106 first performs processing to determine that the additional input can be trusted. For instance, the build proxy server 106 may apply certain criteria (or rules) to determine if the repository that the additional input resides in is trustworthy. For instance, the rules may specify a set of conditions that determine the credibility or reputation of the repository (such as if the repository is blacklisted) and the like. Upon establishing the credibility of the repository, the build proxy server 104 then downloads (replicates) the content of the additional input into a downloaded artifacts store 124 associated with the build system. By replicating the content of an additional input residing outside the network trust boundary of the build container 104 in a local storage system (e.g., 124) residing within the network trust boundary of the build system, the build system 102 is able to accurately track, identify and record each additional input component and/or input component dependency used by the build container to perform the build. In certain embodiments, and as will be described in detail in FIG. 3 and FIG. 4 below, the additional inputs identified and recorded by the build system 102 may be re-used by the build system to re-execute the original build in a hermetically sealed environment.

In a certain implementation, the used artifacts store 124 resides inside the network trust boundary of the build system 102. To ensure the security of the downloaded content, the build proxy server 106 may additionally be configured to generate a hash value for the additional input, where the hash value represents the content of the additional input. As will be described in greater detail in FIG. 3 and FIG. 4, the resultant hash value may be used to match/identify/verify the content of the additional input used by the build system when the build is re-executed (validated) in a hermetically sealed environment.

In certain examples, in addition to downloading the content of the additional input to the downloaded artifacts store 124, at block 216, the build proxy server 104 tags/classifies the additional input as 'untrusted' and adds the additional input to the list of build inputs represented in the SBOM repository 114 in the build system 102.

At block 218, the build system uses the additional input to execute the build and generate a target build artifact. In certain examples, the build system may then repeat the processes described in blocks 204-218 to capture, identify and record one or more additional inputs used by the build container for successfully performing the build. By identifying and monitoring the network traffic received to and from the build container with various different network endpoints located within or outside a network trust boundary associated with the build system, the build proxy server 106 is able to identify a complete and accurate list of all additional inputs used by the build container 104 for performing the build.

As previously described, in the embodiment depicted in FIG. 1 and FIG. 2, the build system 102 executes a build (also referred to herein as an original build) by capturing and identifying all the additional inputs (i.e., the additional input components and/or input component dependencies) used by the build process to generate a target build artifact. In certain embodiments, the original build may be re-executed (i.e., repeated or validated) by the build system in a hermetically sealed environment based on only the "observed" additional inputs that were captured, identified and recorded by the build system from the original build. As previously described, a hermetically sealed (closed) environment refers to a self-contained build environment that does not have network access to endpoints located outside the build environment and does not depend on external artifacts or dependencies located outside of the build environment to execute the build to generate a target build artifact.

Since the original build is re-executed based on only the observed, original and unchanged additional inputs from the original build, the original build can be re-executed in a hermetically sealed environment with very few or no modifications to the build process. The re-execution of the build in a hermetically sealed environment solely as a function of the inputs identified during an original build results in an attested repeatable build that in turn can be used to mitigate the supply chain risk and enhance the security of the supply chain management process.

Figure 3:
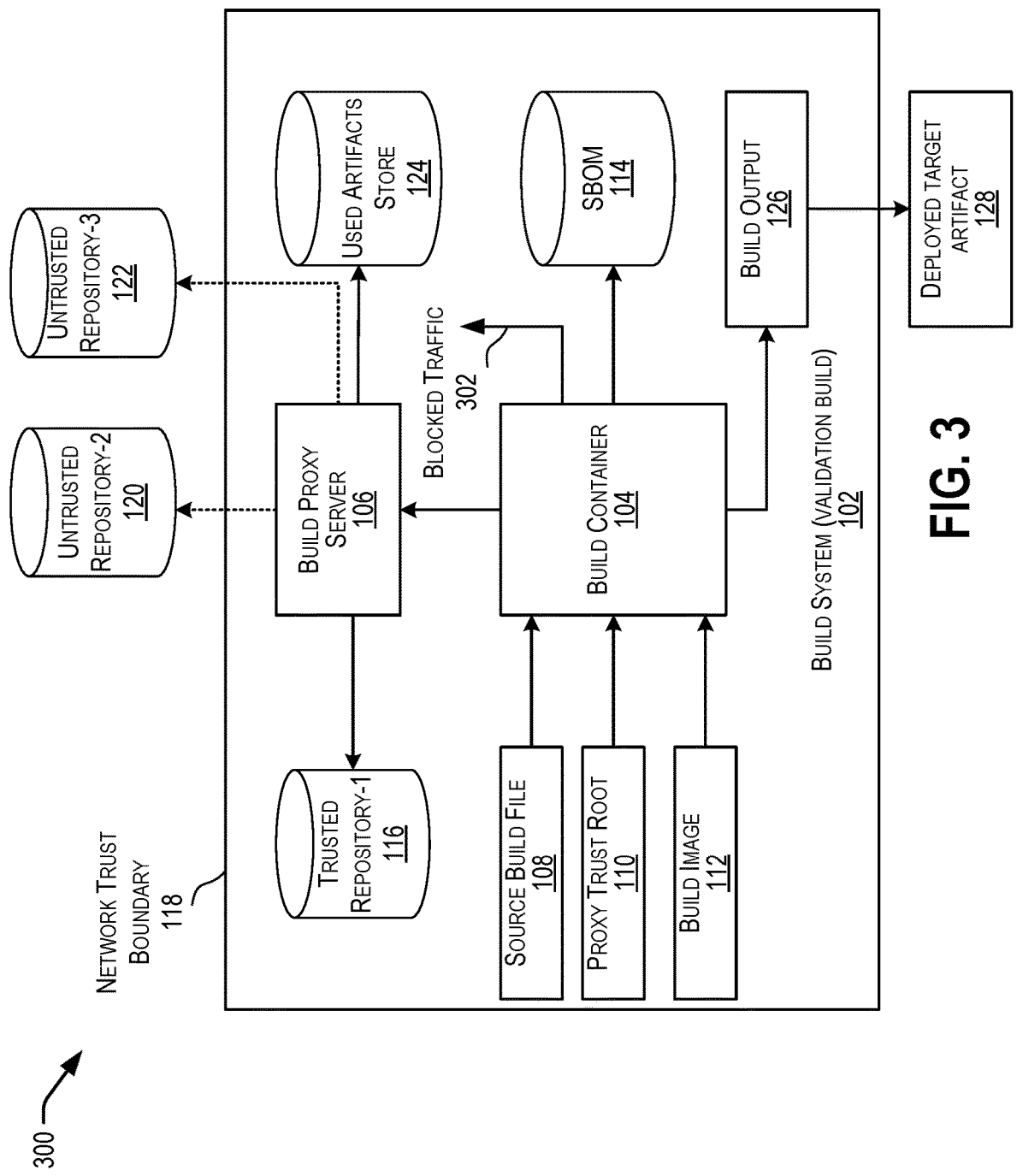
FIG. 3 illustrates a computing environment comprising a build system that includes capabilities for re-executing an original build in a hermetically sealed environment based on observed additional inputs that were captured, identified and recorded from the original build, according to certain embodiments.

FIG. 3 illustrates a computing environment comprising a build system that includes capabilities for re-executing (validating) an original build in a hermetically sealed (closed) environment based on observed additional inputs that were captured, identified and recorded from the original build, according to certain embodiments. As depicted in FIG. 1, the build system 102 comprises a build container 104 that may be implemented using any software build tool (e.g., a docker container) configured to perform/execute the build. The build container 104 receives a list of inputs (i.e., an initial list of inputs) to perform a build. The list of inputs to the build container 104 may include a source build file 108 which provides the source code and system configuration information for performing/executing the build, a proxy trust root 110 that identifies the location of a specific build proxy server (e.g., 106) used by the build system for monitoring network communications to and from the build container 104 and a build image 112 used by the build container 104 to execute the build.

Based on the set of inputs provided to the build container 104, the build container 104 identifies one or more additional inputs (components) for performing the build. The additional inputs may represent additional input components and/or input component dependencies used by the build container 104 for successfully executing the build. In certain examples, the additional inputs may be identified based on information specified in the source input file 108. For instance, as previously described, a file 'A' specified in the source build file 108 may represent an additional input component used by the build container 104 for successfully performing the build. The file 'A' may include header information identifying a link to a system library or to an open source file that is required by the additional input component A for successfully executing the build. This link/system library may represent an input component dependency (i.e., an external artifact) used by the build container for successfully executing the build.

Based on the information specified in the source input file 108, as part of executing the build process, the build container 104 then transmits multiple requests (i.e., build input requests) to establish communication with one or more network endpoints (e.g., an IP address or a port number) associated with the additional inputs (i.e., additional input components and/or input component dependencies) to perform the build. In a certain implementation, the requests from the build container 104 are intercepted by the build proxy server 106 which monitors the interactions of the build container 104 with various different network endpoints associated with the additional inputs.

Since the additional inputs used by the build container 106 to perform the original build can be obtained directly either from trusted repositories (e.g., 116) and/or from a local storage system (e.g., the used artifacts store 124) residing inside the network trust boundary (i.e., within a hermetically sealed environment) of the build system, the build container 104 does not need to fetch additional inputs and/or input component dependencies residing outside the network trust boundary (e.g., from untrusted repositories 120, 122) of the hermetic build system 302 at runtime to perform the validation build. To further ensure that the validation build is strictly executed within the boundaries of the hermetically sealed environment, the build proxy server 106 blocks all external build input requests/calls (302) made by the build container 104 to network endpoints located outside the network trust boundary of the hermetic build system. Thus, any communication from the build container 104 with an untrusted component or an untrusted repository residing outside the network trust boundary (shown by dotted lines in FIG. 3) is flagged by the build proxy server 106 as a violation and the build process is halted with an error message. In this manner, the build proxy server 106 ensures that the observed components (additional inputs) that were captured and recorded by the build system to perform the original build are the same additional inputs used by the build container 104 during the re-execution of the build and the subsequent deployment of the target artifact.

In certain implementations, to account for any unexpected changes made to additional inputs (e.g., stored in the used artifacts store 124) and used by the build container during re-execution of the build, the build proxy server 106 may be configured with capabilities to check if the content of the additional input stored in the used artifacts store 124 matches its corresponding hash value representation. Upon retrieval, if the content of the additional input does not match its corresponding hash value representation, the build proxy server 106 determines that the additional input being used to re-execute the build is not the same as the original additional input that was used to perform the original build process. The build proxy server 106 flags this as a violation and halts the build process.

By permitting only the observed, original and unchanged additional inputs from the original build to be consumed during the re-execution (validation) of the original build, the build can be re-executed in a hermetically sealed environment with few or no modifications to the build process. This enables end-users of the hermetic build system to get the benefits of observable, repeatable builds, including high-quality dependency tracking which in turn, can be used to support other activities (such as vulnerability tracking) to mitigate software supply chain risk and ensure higher levels of supply chain security.

Figure 4:
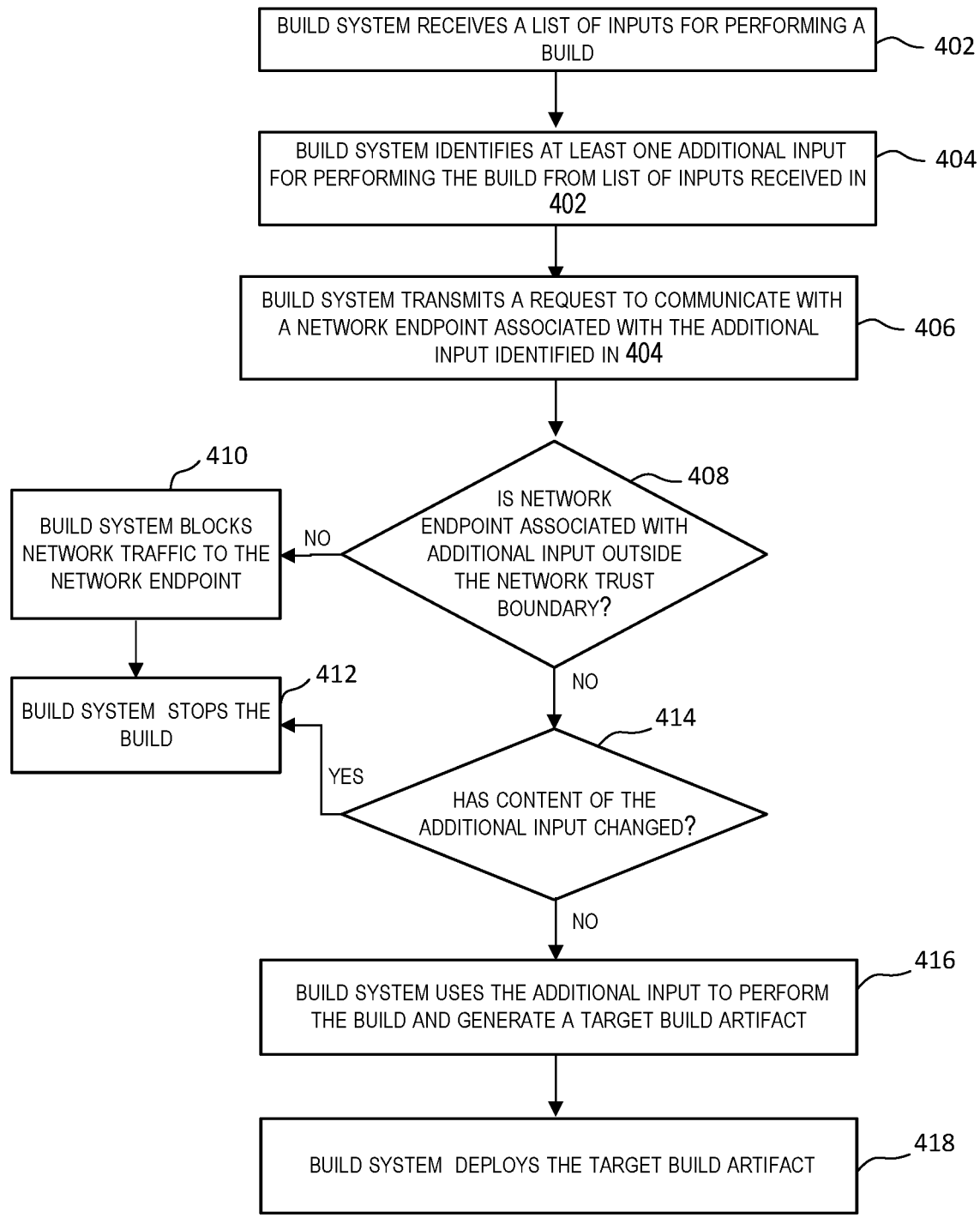
FIG. 4 depicts an example of a process performed by the build system depicted in FIG. 3, according to certain embodiments.

FIG. 4 depicts an example of a process 400 performed by the build system depicted in FIG. 3, according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order, or some steps may also be performed in parallel. In certain embodiments, such as in the embodiment depicted in FIG. 3, the processing depicted in FIG. 4 may be performed by one or more subsystems (e.g., the build container 104 and the build proxy server 106) of the build system.

At block 402, processing is initiated when the build container 104 receives a list of inputs for performing a build process. As previously described, in certain examples, the list of inputs may include the source build file 108 which provides the source code and system configuration information for executing the build, a proxy trust root 110 that identifies the location of a specific proxy server (e.g., 106) used by the hermetic build system 302 for monitoring network communications to and from the build container (e.g., 104) and a build image 112 used by the build container 104 to execute the build.

At block 404, from the list of inputs received in block 402, the build system identifies at least one additional input for performing the build. In a certain implementation, the build container 104 within the build system identifies the additional input based on, for instance, information specified in an initial input (e.g., the source input file 108) provided to the build container. As previously described, the additional input may represent an additional input component, or an input component dependency used by the build container 104 for executing the build.

At block 406, the build container 104 transmits a request (i.e., a build input request) to establish communication with a network endpoint (e.g., an IP address or a port number) associated with the additional input identified in block 404.

At block 408, the request is intercepted by the build proxy server 106 which determines if the network endpoint that the build container 104 is attempting to establish connection with is outside the network trust boundary associated with the build system. For instance, if the source input file 108 is modified (e.g., by an end user) since the previous build (original build) was executed, it may specify a new input component dependency that was not specified in the original source input file. As part of executing the build, the build container 104 may transmit a request to establish communication with a network endpoint associated with the new input component dependency. If the network endpoint associated with the new input component dependency is located outside the network trust boundary 118, then at block 410, the build proxy server 106 blocks the network traffic to and from the network endpoint and at block 412, stops the build process. In this manner, the build proxy server 106 ensures that only the observed, original and unchanged additional inputs from the original build are consumed during the re-execution (validation) of the original build within the hermetically sealed environment.

If the build proxy server 106 determines that the network endpoint associated with the additional input is inside the network trust boundary associated with the build system, then the processing proceeds to block 414 where the build proxy server determines if the content of the additional input has changed since the original build was executed. In a certain implementation, the build proxy server determines if the content of the additional input has changed by determining if the hash value of the additional input has changed. Since the hash value represents the content stored by the additional input, a change in the hash value indicates that the original content of the additional input has changed. If the content has changed since the previous build was executed, then the processing proceeds to block 412 where the build proxy server stops the build process.

If the content of the additional input is unchanged, then at block 416, the build system uses the additional input to perform the build and generate a target build artifact. In certain examples, the build system may repeat the processes described in blocks 404-416 to capture, identify and record each additional input used by the build container for successfully performing the build.

At block 418, the build system deploys the generated target build artifact to production. The deployed target build artifact (e.g., 128) may represent an application, code, an application package, a file and so on that is generated by the build container as a result of executing the build.

The new and improved architecture of the disclosed build system described in the present disclosure provides several technical advancements and/or improvements over conventional build systems. Rather than depending on source code inspection to observe and identify the inputs of a build, using the new and improved architecture of the disclosed build system, a complete and accurate view of all the components that are additional inputs (e.g., additional input components and/or input component dependencies) used by the build container for successfully performing the build can be identified by intercepting and monitoring the network communications of the build container within and outside a network boundary defined around the build container. Additionally, by continuously tracking both internal as well as external interactions via network inspection, incorrectly identified inputs, inputs that can be potentially left out by manual inspection, and/or hidden input dependencies that cannot be identified manually or by using automated processes can be significantly reduced or even eliminated using the disclosed technique.

In certain embodiments, the functionality of the build system may be provided as a service by an Infrastructure-as-a-Service (IaaS) provider. The following section describes an example IaaS infrastructure that may be used to implement the service.

Example Cloud Service Infrastructure Architecture

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 5:
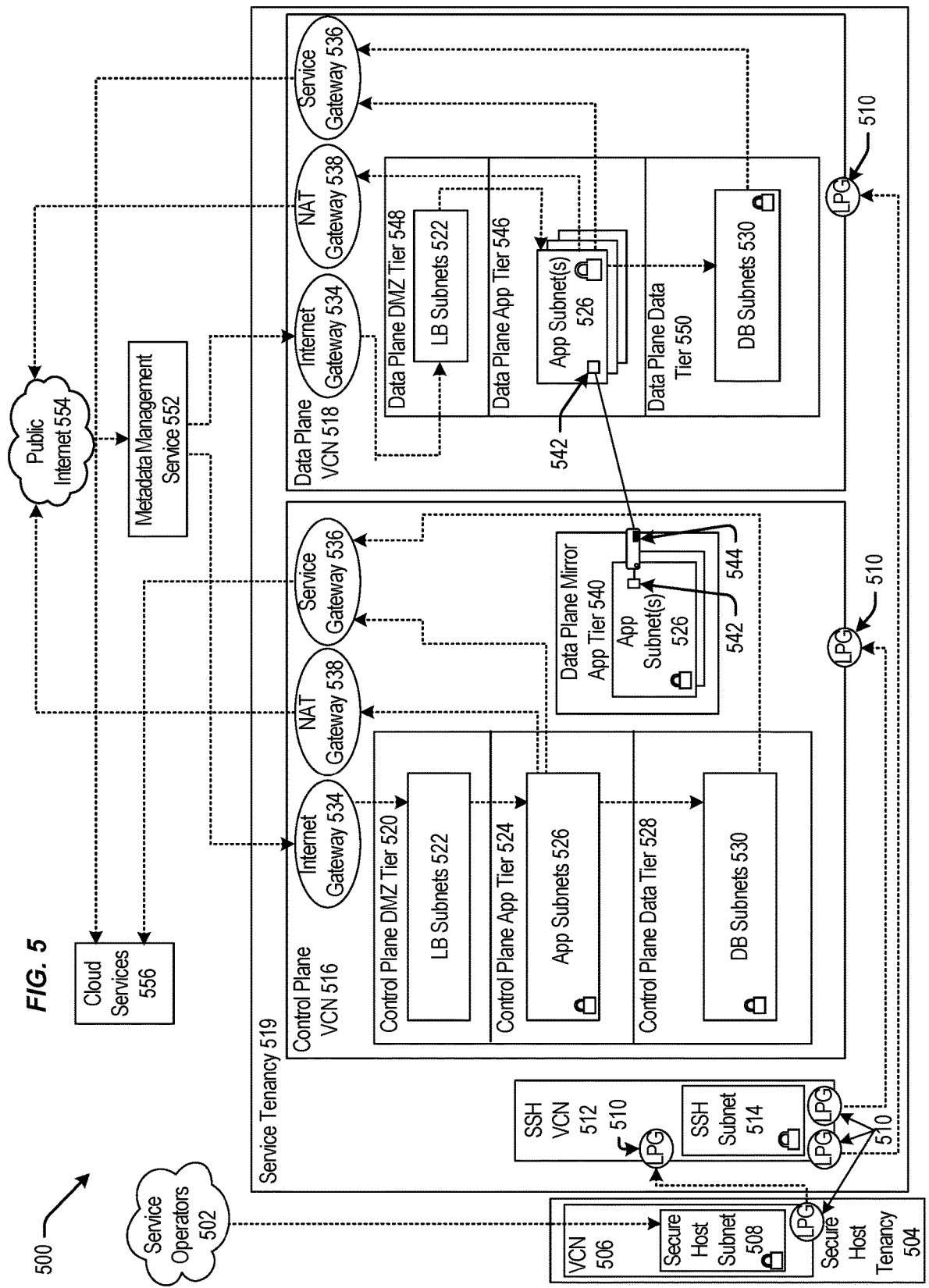
FIG. 5 is a block diagram illustrating one pattern for implementing a cloud infrastructure as a service system, according to at least one embodiment.

FIG. 5 is a block diagram 500 illustrating an example pattern of an IaaS architecture, according to at least one embodiment. Service operators 502 can be communicatively coupled to a secure host tenancy 504 that can include a virtual cloud network (VCN) 506 and a secure host subnet 508. In some examples, the service operators 502 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 506 and/or the Internet.

The VCN 506 can include a local peering gateway (LPG) 510 that can be communicatively coupled to a secure shell (SSH) VCN 512 via an LPG 510 contained in the SSH VCN 512. The SSH VCN 512 can include an SSH subnet 514, and the SSH VCN 512 can be communicatively coupled to a control plane VCN 516 via the LPG 510 contained in the control plane VCN 516. Also, the SSH VCN 512 can be communicatively coupled to a data plane VCN 518 via an LPG 510. The control plane VCN 516 and the data plane VCN 518 can be contained in a service tenancy 519 that can be owned and/or operated by the IaaS provider.

The control plane VCN 516 can include a control plane demilitarized zone (DMZ) tier 520 that acts as a perimeter network (e.g., portions of a corporate network between the corporate intranet and external networks). The DMZ-based servers may have restricted responsibilities and help keep breaches contained. Additionally, the DMZ tier 520 can include one or more load balancer (LB) subnet(s) 522, a control plane app tier 524 that can include app subnet(s) 526, a control plane data tier 528 that can include database (DB) subnet(s) 530 (e.g., frontend DB subnet(s) and/or backend DB subnet(s)). The LB subnet(s) 522 contained in the control plane DMZ tier 520 can be communicatively coupled to the app subnet(s) 526 contained in the control plane app tier 524 and an Internet gateway 534 that can be contained in the control plane VCN 516, and the app subnet(s) 526 can be communicatively coupled to the DB subnet(s) 530 contained in the control plane data tier 528 and a service gateway 536 and a network address translation (NAT) gateway 538. The control plane VCN 516 can include the service gateway 536 and the NAT gateway 538.

The control plane VCN 516 can include a data plane mirror app tier 540 that can include app subnet(s) 526. The app subnet(s) 526 contained in the data plane mirror app tier 540 can include a virtual network interface controller (VNIC) 542 that can execute a compute instance 544. The compute instance 544 can communicatively couple the app subnet(s) 526 of the data plane mirror app tier 540 to app subnet(s) 526 that can be contained in a data plane app tier 546.

The data plane VCN 518 can include the data plane app tier 546, a data plane DMZ tier 548, and a data plane data tier 550. The data plane DMZ tier 548 can include LB subnet(s) 522 that can be communicatively coupled to the app subnet(s) 526 of the data plane app tier 546 and the Internet gateway 534 of the data plane VCN 518. The app subnet(s) 526 can be communicatively coupled to the service gateway 536 of the data plane VCN 518 and the NAT gateway 538 of the data plane VCN 518. The data plane data tier 550 can also include the DB subnet(s) 530 that can be communicatively coupled to the app subnet(s) 526 of the data plane app tier 546.

The Internet gateway 534 of the control plane VCN 516 and of the data plane VCN 518 can be communicatively coupled to a metadata management service 552 that can be communicatively coupled to public Internet 554. Public Internet 554 can be communicatively coupled to the NAT gateway 538 of the control plane VCN 516 and of the data plane VCN 518. The service gateway 536 of the control plane VCN 516 and of the data plane VCN 518 can be communicatively couple to cloud services 556.

In some examples, the service gateway 536 of the control plane VCN 516 or of the data plane VCN 518 can make application programming interface (API) calls to cloud services 556 without going through public Internet 554. The API calls to cloud services 556 from the service gateway 536 can be one-way: the service gateway 536 can make API calls to cloud services 556, and cloud services 556 can send requested data to the service gateway 536. But, cloud services 556 may not initiate API calls to the service gateway 536.

In some examples, the secure host tenancy 504 can be directly connected to the service tenancy 519, which may be otherwise isolated. The secure host subnet 508 can communicate with the SSH subnet 514 through an LPG 510 that may enable two-way communication over an otherwise isolated system. Connecting the secure host subnet 508 to the SSH subnet 514 may give the secure host subnet 508 access to other entities within the service tenancy 519.

The control plane VCN 516 may allow users of the service tenancy 519 to set up or otherwise provision desired resources. Desired resources provisioned in the control plane VCN 516 may be deployed or otherwise used in the data plane VCN 518. In some examples, the control plane VCN 516 can be isolated from the data plane VCN 518, and the data plane mirror app tier 540 of the control plane VCN 516 can communicate with the data plane app tier 546 of the data plane VCN 518 via VNICs 542 that can be contained in the data plane mirror app tier 540 and the data plane app tier 546.

In some examples, users of the system, or customers, can make requests, for example create, read, update, or delete (CRUD) operations, through public Internet 554 that can communicate the requests to the metadata management service 552. The metadata management service 552 can communicate the request to the control plane VCN 516 through the Internet gateway 534. The request can be received by the LB subnet(s) 522 contained in the control plane DMZ tier 520. The LB subnet(s) 522 may determine that the request is valid, and in response to this determination, the LB subnet(s) 522 can transmit the request to app subnet(s) 526 contained in the control plane app tier 524. If the request is validated and requires a call to public Internet 554, the call to public Internet 554 may be transmitted to the NAT gateway 538 that can make the call to public Internet 554. Metadata that may be desired to be stored by the request can be stored in the DB subnet(s) 530.

In some examples, the data plane mirror app tier 540 can facilitate direct communication between the control plane VCN 516 and the data plane VCN 518. For example, changes, updates, or other suitable modifications to configuration may be desired to be applied to the resources contained in the data plane VCN 518. Via a VNIC 542, the control plane VCN 516 can directly communicate with, and can thereby execute the changes, updates, or other suitable modifications to configuration to, resources contained in the data plane VCN 518.

In some embodiments, the control plane VCN 516 and the data plane VCN 518 can be contained in the service tenancy 519. In this case, the user, or the customer, of the system may not own or operate either the control plane VCN 516 or the data plane VCN 518. Instead, the IaaS provider may own or operate the control plane VCN 516 and the data plane VCN 518, both of which may be contained in the service tenancy 519. This embodiment can enable isolation of networks that may prevent users or customers from interacting with other users', or other customers', resources. Also, this embodiment may allow users or customers of the system to store databases privately without needing to rely on public Internet 554, which may not have a desired level of threat prevention, for storage.

In other embodiments, the LB subnet(s) 522 contained in the control plane VCN 516 can be configured to receive a signal from the service gateway 536. In this embodiment, the control plane VCN 516 and the data plane VCN 518 may be configured to be called by a customer of the IaaS provider without calling public Internet 554. Customers of the IaaS provider may desire this embodiment since database(s) that the customers use may be controlled by the IaaS provider and may be stored on the service tenancy 519, which may be isolated from public Internet 554.

Figure 6:
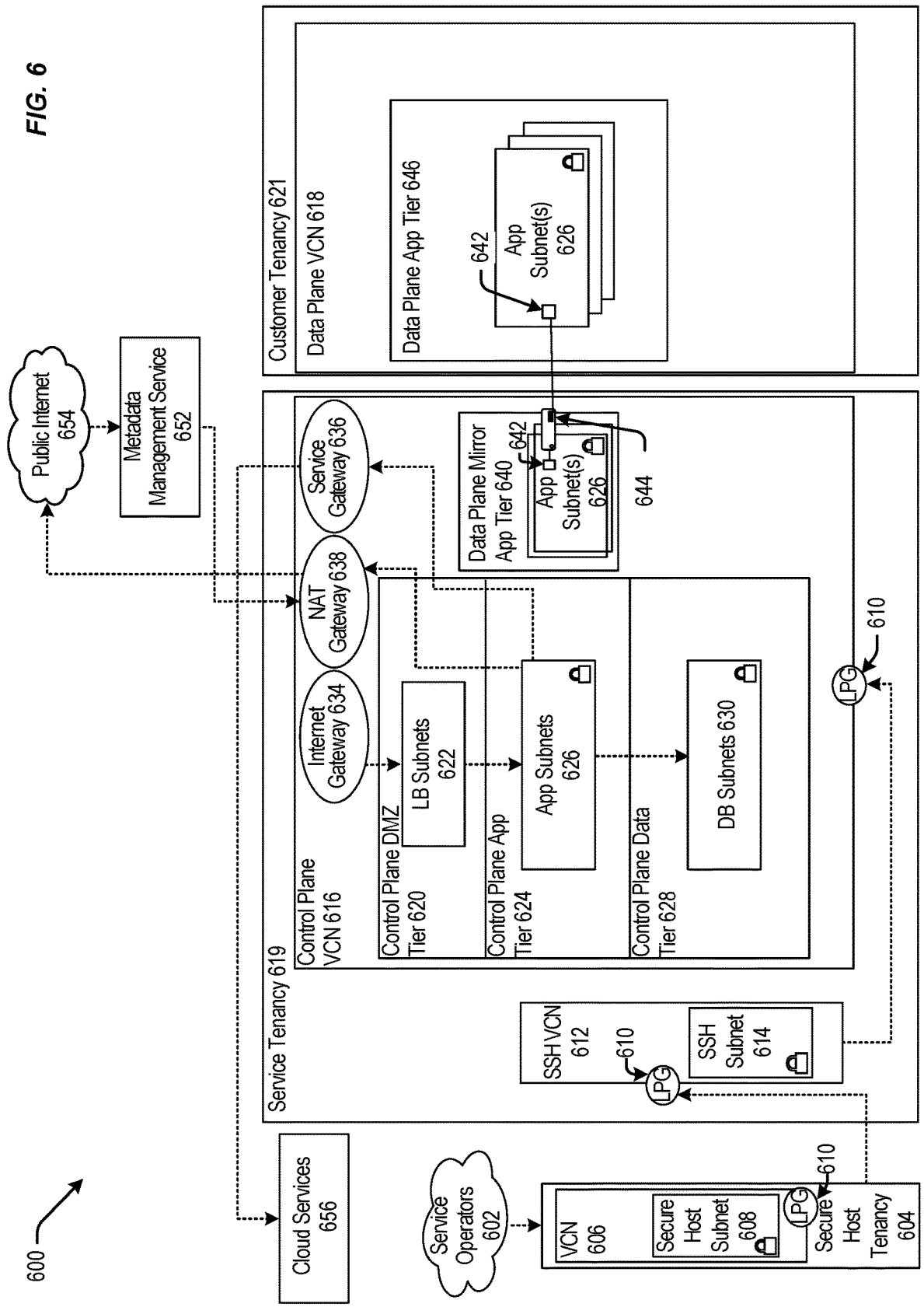
FIG. 6 is a block diagram illustrating another pattern for implementing a cloud infrastructure as a service system, according to at least one embodiment.

FIG. 6 is a block diagram 600 illustrating another example pattern of an IaaS architecture, according to at least one embodiment. Service operators 602 (e.g., service operators 502 of FIG. 5) can be communicatively coupled to a secure host tenancy 604 (e.g., the secure host tenancy 504 of FIG. 5) that can include a virtual cloud network (VCN) 606 (e.g., the VCN 506 of FIG. 5) and a secure host subnet 608 (e.g., the secure host subnet 508 of FIG. 5). The VCN 606 can include a local peering gateway (LPG) 610 (e.g., the LPG 510 of FIG. 5) that can be communicatively coupled to a secure shell (SSH) VCN 612 (e.g., the SSH VCN 512 of FIG. 5) via an LPG 510 contained in the SSH VCN 612. The SSH VCN 612 can include an SSH subnet 614 (e.g., the SSH subnet 514 of FIG. 5), and the SSH VCN 612 can be communicatively coupled to a control plane VCN 616 (e.g., the control plane VCN 516 of FIG. 5) via an LPG 610 contained in the control plane VCN 616. The control plane VCN 616 can be contained in a service tenancy 619 (e.g., the service tenancy 519 of FIG. 5), and the data plane VCN 618 (e.g., the data plane VCN 518 of FIG. 5) can be contained in a customer tenancy 621 that may be owned or operated by users, or customers, of the system.

The control plane VCN 616 can include a control plane DMZ tier 620 (e.g., the control plane DMZ tier 520 of FIG. 5) that can include LB subnet(s) 622 (e.g., LB subnet(s) 522 of FIG. 5), a control plane app tier 624 (e.g., the control plane app tier 524 of FIG. 5) that can include app subnet(s) 626 (e.g., app subnet(s) 526 of FIG. 5), a control plane data tier 628 (e.g., the control plane data tier 528 of FIG. 5) that can include database (DB) subnet(s) 630 (e.g., similar to DB subnet(s) 530 of FIG. 5). The LB subnet(s) 622 contained in the control plane DMZ tier 620 can be communicatively coupled to the app subnet(s) 626 contained in the control plane app tier 624 and an Internet gateway 634 (e.g., the Internet gateway 534 of FIG. 5) that can be contained in the control plane VCN 616, and the app subnet(s) 626 can be communicatively coupled to the DB subnet(s) 630 contained in the control plane data tier 628 and a service gateway 636 (e.g., the service gateway 536 of FIG. 5) and a network address translation (NAT) gateway 638 (e.g., the NAT gateway 538 of FIG. 5). The control plane VCN 616 can include the service gateway 636 and the NAT gateway 638.

The control plane VCN 616 can include a data plane mirror app tier 640 (e.g., the data plane mirror app tier 540 of FIG. 5) that can include app subnet(s) 626. The app subnet(s) 626 contained in the data plane mirror app tier 640 can include a virtual network interface controller (VNIC) 642 (e.g., the VNIC of 542) that can execute a compute instance 644 (e.g., similar to the compute instance 544 of FIG. 5). The compute instance 644 can facilitate communication between the app subnet(s) 626 of the data plane mirror app tier 640 and the app subnet(s) 626 that can be contained in a data plane app tier 646 (e.g., the data plane app tier 546 of FIG. 5) via the VNIC 642 contained in the data plane mirror app tier 640 and the VNIC 642 contained in the data plane app tier 646.

The Internet gateway 634 contained in the control plane VCN 616 can be communicatively coupled to a metadata management service 652 (e.g., the metadata management service 552 of FIG. 5) that can be communicatively coupled to public Internet 654 (e.g., public Internet 554 of FIG. 5). Public Internet 654 can be communicatively coupled to the NAT gateway 638 contained in the control plane VCN 616. The service gateway 636 contained in the control plane VCN 616 can be communicatively couple to cloud services 656 (e.g., cloud services 556 of FIG. 5).

In some examples, the data plane VCN 618 can be contained in the customer tenancy 621. In this case, the IaaS provider may provide the control plane VCN 616 for each customer, and the IaaS provider may, for each customer, set up a unique compute instance 644 that is contained in the service tenancy 619. Each compute instance 644 may allow communication between the control plane VCN 616, contained in the service tenancy 619, and the data plane VCN 618 that is contained in the customer tenancy 621. The compute instance 644 may allow resources, that are provisioned in the control plane VCN 616 that is contained in the service tenancy 619, to be deployed or otherwise used in the data plane VCN 618 that is contained in the customer tenancy 621.

In other examples, the customer of the IaaS provider may have databases that live in the customer tenancy 621. In this example, the control plane VCN 616 can include the data plane mirror app tier 640 that can include app subnet(s) 626. The data plane mirror app tier 640 can reside in the data plane VCN 618, but the data plane mirror app tier 640 may not live in the data plane VCN 618. That is, the data plane mirror app tier 640 may have access to the customer tenancy 621, but the data plane mirror app tier 640 may not exist in the data plane VCN 618 or be owned or operated by the customer of the IaaS provider. The data plane mirror app tier 640 may be configured to make calls to the data plane VCN 618 but may not be configured to make calls to any entity contained in the control plane VCN 616. The customer may desire to deploy or otherwise use resources in the data plane VCN 618 that are provisioned in the control plane VCN 616, and the data plane mirror app tier 640 can facilitate the desired deployment, or other usage of resources, of the customer.

In some embodiments, the customer of the IaaS provider can apply filters to the data plane VCN 618. In this embodiment, the customer can determine what the data plane VCN 618 can access, and the customer may restrict access to public Internet 654 from the data plane VCN 618. The IaaS provider may not be able to apply filters or otherwise control access of the data plane VCN 618 to any outside networks or databases. Applying filters and controls by the customer onto the data plane VCN 618, contained in the customer tenancy 621, can help isolate the data plane VCN 618 from other customers and from public Internet 654.

In some embodiments, cloud services 656 can be called by the service gateway 636 to access services that may not exist on public Internet 654, on the control plane VCN 616, or on the data plane VCN 618. The connection between cloud services 656 and the control plane VCN 616 or the data plane VCN 618 may not be live or continuous. Cloud services 656 may exist on a different network owned or operated by the IaaS provider. Cloud services 656 may be configured to receive calls from the service gateway 636 and may be configured to not receive calls from public Internet 654. Some cloud services 656 may be isolated from other cloud services 656, and the control plane VCN 616 may be isolated from cloud services 656 that may not be in the same region as the control plane VCN 616. For example, the control plane VCN 616 may be located in "Region 1," and cloud service "Deployment 5," may be located in Region 1 and in "Region 2." If a call to Deployment 5 is made by the service gateway 636 contained in the control plane VCN 616 located in Region 1, the call may be transmitted to Deployment 5 in Region 1. In this example, the control plane VCN 616, or Deployment 5 in Region 1, may not be communicatively coupled to, or otherwise in communication with, Deployment 5 in Region 2.

Figure 7:
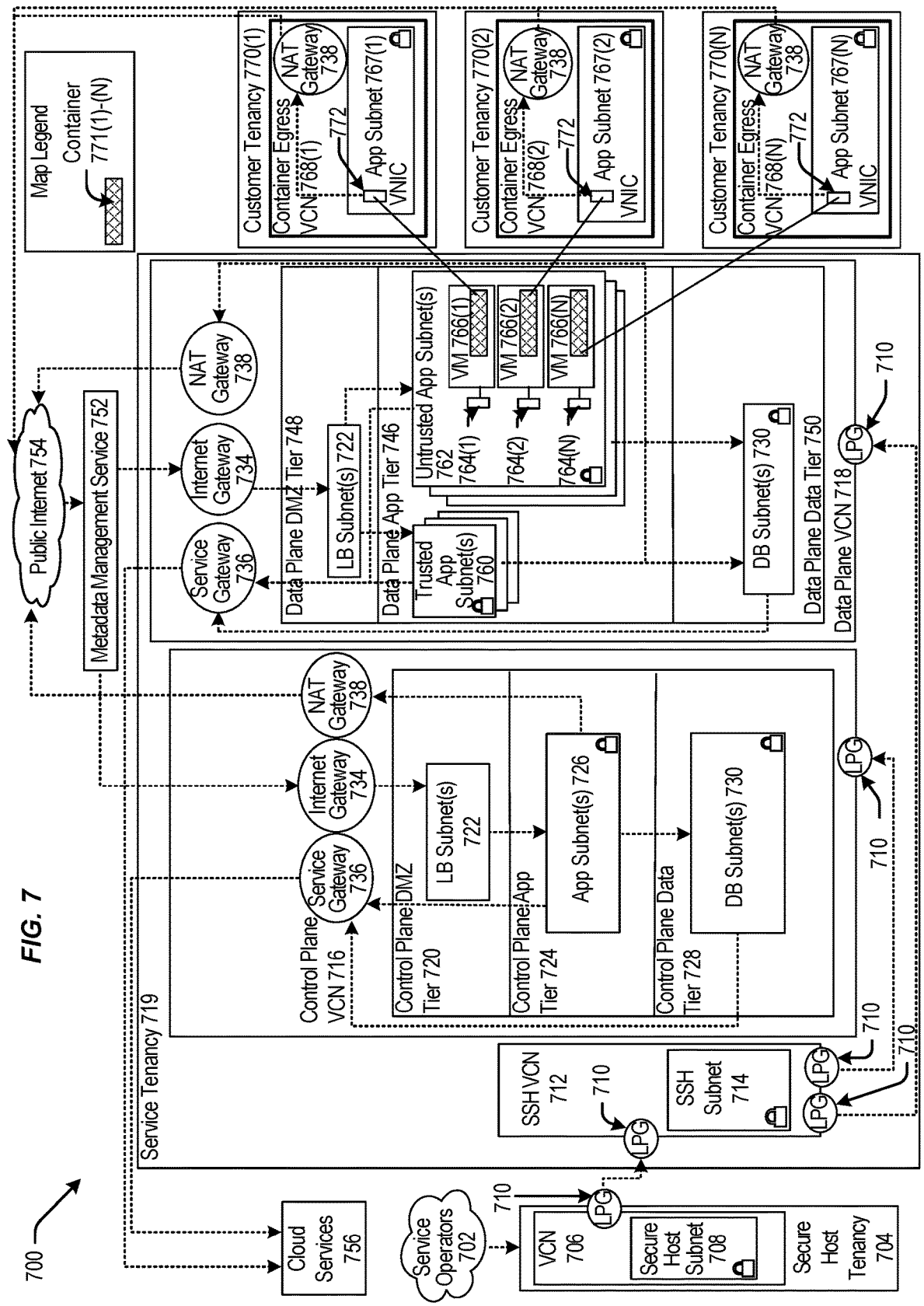
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g., service operators 502 of FIG. 5) can be communicatively coupled to a secure host tenancy 704 (e.g., the secure host tenancy 504 of FIG. 5) that can include a virtual cloud network (VCN) 706 (e.g., the VCN 506 of FIG. 5) and a secure host subnet 708 (e.g., the secure host subnet 508 of FIG. 5). The VCN 706 can include an LPG 710 (e.g., the LPG 510 of FIG. 5) that can be communicatively coupled to an SSH VCN 712 (e.g., the SSH VCN 512 of FIG. 5) via an LPG 710 contained in the SSH VCN 712. The SSH VCN 712 can include an SSH subnet 714 (e.g., the SSH subnet 514 of FIG. 5), and the SSH VCN 712 can be communicatively coupled to a control plane VCN 716 (e.g., the control plane VCN 516 of FIG. 5) via an LPG 710 contained in the control plane VCN 716 and to a data plane VCN 718 (e.g., the data plane 518 of FIG. 5) via an LPG 710 contained in the data plane VCN 718. The control plane VCN 716 and the data plane VCN 718 can be contained in a service tenancy 719 (e.g., the service tenancy 519 of FIG. 5).

The control plane VCN 716 can include a control plane DMZ tier 720 (e.g., the control plane DMZ tier 520 of FIG. 5) that can include load balancer (LB) subnet(s) 722 (e.g., LB subnet(s) 522 of FIG. 5), a control plane app tier 724 (e.g., the control plane app tier 524 of FIG. 5) that can include app subnet(s) 726 (e.g., similar to app subnet(s) 526 of FIG. 5), a control plane data tier 728 (e.g., the control plane data tier 528 of FIG. 5) that can include DB subnet(s)

730. The LB subnet(s) 722 contained in the control plane DMZ tier 720 can be communicatively coupled to the app subnet(s) 726 contained in the control plane app tier 724 and to an Internet gateway 734 (e.g., the Internet gateway 534 of FIG. 5) that can be contained in the control plane VCN 716, and the app subnet(s) 726 can be communicatively coupled to the DB subnet(s) 730 contained in the control plane data tier 728 and to a service gateway 736 (e.g., the service gateway of FIG. 5) and a network address translation (NAT) gateway 738 (e.g., the NAT gateway 538 of FIG. 5). The control plane VCN 716 can include the service gateway 736 and the NAT gateway 738.

The data plane VCN 718 can include a data plane app tier 746 (e.g., the data plane app tier 546 of FIG. 5), a data plane DMZ tier 748 (e.g., the data plane DMZ tier 548 of FIG. 5), and a data plane data tier 750 (e.g., the data plane data tier 550 of FIG. 5). The data plane DMZ tier 748 can include LB subnet(s) 722 that can be communicatively coupled to trusted app subnet(s) 760 and untrusted app subnet(s) 762 of the data plane app tier 746 and the Internet gateway 734 contained in the data plane VCN 718. The trusted app subnet(s) 760 can be communicatively coupled to the service gateway 736 contained in the data plane VCN 718, the NAT gateway 738 contained in the data plane VCN 718, and DB subnet(s) 730 contained in the data plane data tier 750. The untrusted app subnet(s) 762 can be communicatively coupled to the service gateway 736 contained in the data plane VCN 718 and DB subnet(s) 730 contained in the data plane data tier 750. The data plane data tier 750 can include DB subnet(s) 730 that can be communicatively coupled to the service gateway 736 contained in the data plane VCN 718.

The untrusted app subnet(s) 762 can include one or more primary VNICs 764(1)-(N) that can be communicatively coupled to tenant virtual machines (VMs) 766(1)-(N). Each tenant VM 766(1)-(N) can be communicatively coupled to a respective app subnet 767(1)-(N) that can be contained in respective container egress VCNs 768(1)-(N) that can be contained in respective customer tenancies 770(1)-(N). Respective secondary VNICs 772(1)-(N) can facilitate communication between the untrusted app subnet(s) 762 contained in the data plane VCN 718 and the app subnet contained in the container egress VCNs 768(1)-(N). Each container egress VCNs 768(1)-(N) can include a NAT gateway 738 that can be communicatively coupled to public Internet 754 (e.g., public Internet 554 of FIG. 5).

The Internet gateway 734 contained in the control plane VCN 716 and contained in the data plane VCN 718 can be communicatively coupled to a metadata management service 752 (e.g., the metadata management system 552 of FIG. 5) that can be communicatively coupled to public Internet 754. Public Internet 754 can be communicatively coupled to the NAT gateway 738 contained in the control plane VCN 716 and contained in the data plane VCN 718. The service gateway 736 contained in the control plane VCN 716 and contained in the data plane VCN 718 can be communicatively couple to cloud services 756.

In some embodiments, the data plane VCN 718 can be integrated with customer tenancies 770. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 746. Code to run the function may be executed in the VMs 766(1)-(N), and the code may not be configured to run anywhere else on the data plane VCN 718. Each VM 766(1)-(N) may be connected to one customer tenancy 770. Respective containers 771(1)-(N) contained in the VMs 766(1)-(N) may be configured to run the code. In this case, there can be a dual isolation (e.g., the containers 771(1)-(N) running code, where the containers 771(1)-(N) may be contained in at least the VM 766(1)-(N) that are contained in the untrusted app subnet(s) 762), which may help prevent incorrect or otherwise undesirable code from damaging the network of the IaaS provider or from damaging a network of a different customer. The containers 771(1)-(N) may be communicatively coupled to the customer tenancy 770 and may be configured to transmit or receive data from the customer tenancy 770. The containers 771(1)-(N) may not be configured to transmit or receive data from any other entity in the data plane VCN 718. Upon completion of running the code, the IaaS provider may kill or otherwise dispose of the containers 771(1)-(N).

In some embodiments, the trusted app subnet(s) 760 may run code that may be owned or operated by the IaaS provider. In this embodiment, the trusted app subnet(s) 760 may be communicatively coupled to the DB subnet(s) 730 and be configured to execute CRUD operations in the DB subnet(s) 730. The untrusted app subnet(s) 762 may be communicatively coupled to the DB subnet(s) 730, but in this embodiment, the untrusted app subnet(s) may be configured to execute read operations in the DB subnet(s) 730. The containers 771(1)-(N) that can be contained in the VM 766(1)-(N) of each customer and that may run code from the customer may not be communicatively coupled with the DB subnet(s) 730.

In other embodiments, the control plane VCN 716 and the data plane VCN 718 may not be directly communicatively coupled. In this embodiment, there may be no direct communication between the control plane VCN 716 and the data plane VCN 718. However, communication can occur indirectly through at least one method. An LPG 710 may be established by the IaaS provider that can facilitate communication between the control plane VCN 716 and the data plane VCN 718. In another example, the control plane VCN 716 or the data plane VCN 718 can make a call to cloud services 756 via the service gateway 736. For example, a call to cloud services 756 from the control plane VCN 716 can include a request for a service that can communicate with the data plane VCN 718.

Figure 8:
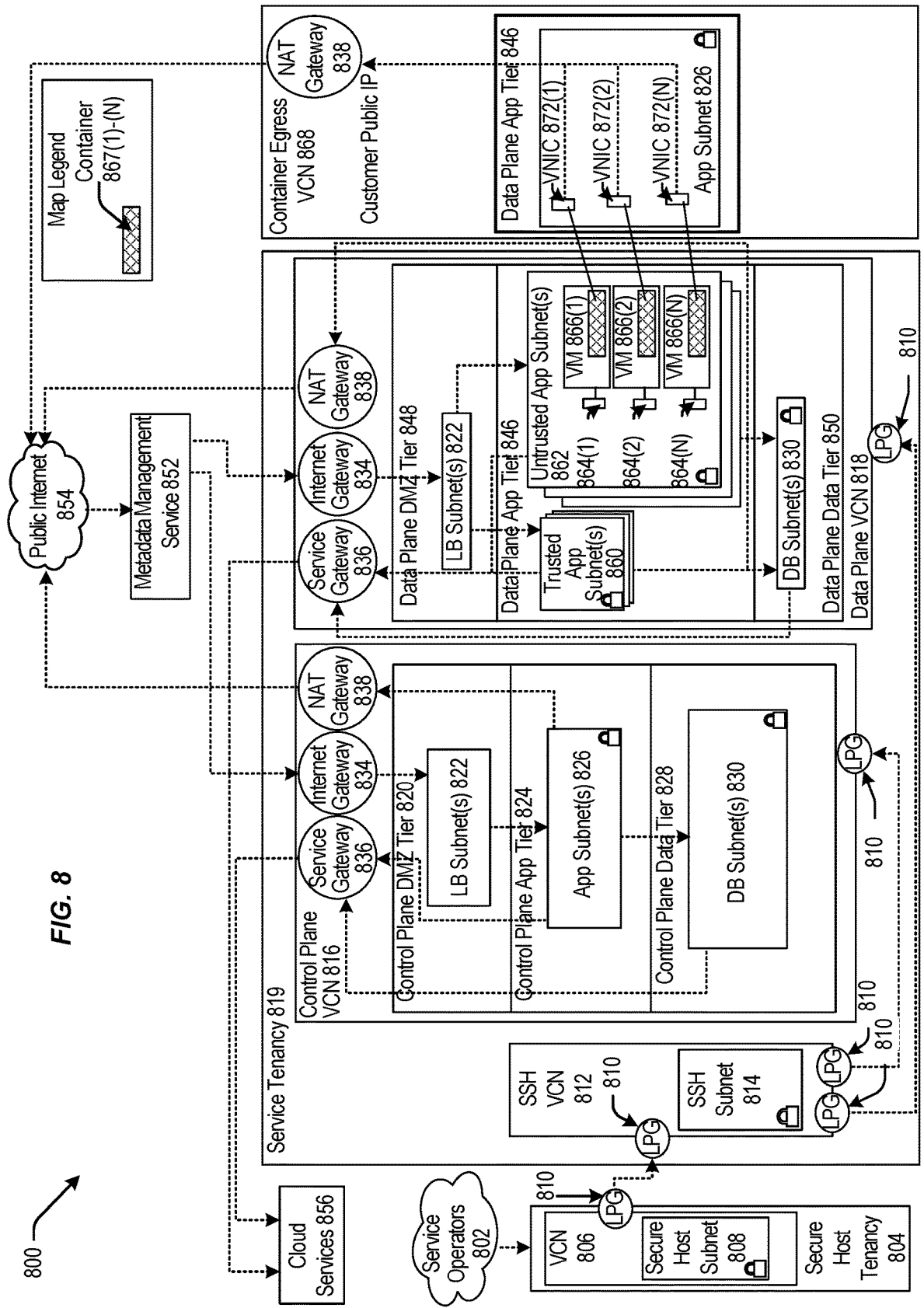
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 502 of FIG. 5) can be communicatively coupled to a secure host tenancy 804 (e.g., the secure host tenancy 504 of FIG. 5) that can include a virtual cloud network (VCN) 806 (e.g., the VCN 506 of FIG. 5) and a secure host subnet 808 (e.g., the secure host subnet 508 of FIG. 5). The VCN 806 can include an LPG 810 (e.g., the LPG 510 of FIG. 5) that can be communicatively coupled to an SSH VCN 812 (e.g., the SSH VCN 512 of FIG. 5) via an LPG 810 contained in the SSH VCN 812. The SSH VCN 812 can include an SSH subnet 814 (e.g., the SSH subnet 514 of FIG. 5), and the SSH VCN 812 can be communicatively coupled to a control plane VCN 816 (e.g., the control plane VCN 516 of FIG. 5) via an LPG 810 contained in the control plane VCN 816 and to a data plane VCN 818 (e.g., the data plane 518 of FIG. 5)

via an LPG 810 contained in the data plane VCN 818. The control plane VCN 816 and the data plane VCN 818 can be contained in a service tenancy 819 (e.g., the service tenancy 519 of FIG. 5).

The control plane VCN 816 can include a control plane DMZ tier 820 (e.g., the control plane DMZ tier 520 of FIG. 5) that can include LB subnet(s) 822 (e.g., LB subnet(s) 522 of FIG. 5), a control plane app tier 824 (e.g., the control plane app tier 524 of FIG. 5) that can include app subnet(s) 826 (e.g., app subnet(s) 526 of FIG. 5), a control plane data tier 828 (e.g., the control plane data tier 528 of FIG. 5) that can include DB subnet(s) 830 (e.g., DB subnet(s) 730 of FIG. 7). The LB subnet(s) 822 contained in the control plane DMZ tier 820 can be communicatively coupled to the app subnet(s) 826 contained in the control plane app tier 824 and to an Internet gateway 834 (e.g., the Internet gateway 534 of FIG. 5) that can be contained in the control plane VCN 816, and the app subnet(s) 826 can be communicatively coupled to the DB subnet(s) 830 contained in the control plane data tier 828 and to a service gateway 836 (e.g., the service gateway of FIG. 5) and a network address translation (NAT) gateway 838 (e.g., the NAT gateway 538 of FIG. 5). The control plane VCN 816 can include the service gateway 836 and the NAT gateway 838.

The data plane VCN 818 can include a data plane app tier 846 (e.g., the data plane app tier 546 of FIG. 5), a data plane DMZ tier 848 (e.g., the data plane DMZ tier 548 of FIG. 5), and a data plane data tier 850 (e.g., the data plane data tier 550 of FIG. 5). The data plane DMZ tier 848 can include LB subnet(s) 822 that can be communicatively coupled to trusted app subnet(s) 860 (e.g., trusted app subnet(s) 760 of FIG. 7) and untrusted app subnet(s) 862 (e.g., untrusted app subnet(s) 762 of FIG. 7) of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include primary VNICs 864(1)-(N) that can be communicatively coupled to tenant virtual machines (VMs) 866(1)-(N) residing within the untrusted app subnet(s) 862. Each tenant VM 866(1)-(N) can run code in a respective container 867(1)-(N), and be communicatively coupled to an app subnet 826 that can be contained in a data plane app tier 846 that can be contained in a container egress VCN 868. Respective secondary VNICs 872(1)-(N) can facilitate communication between the untrusted app subnet(s) 862 contained in the data plane VCN 818 and the app subnet contained in the container egress VCN 868. The container egress VCN can include a NAT gateway 838 that can be communicatively coupled to public Internet 854 (e.g., public Internet 554 of FIG. 5).

The Internet gateway 834 contained in the control plane VCN 816 and contained in the data plane VCN 818 can be communicatively coupled to a metadata management service 852 (e.g., the metadata management system 552 of FIG. 5) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some examples, the pattern illustrated by the architecture of block diagram 800 of FIG. 8 may be considered an exception to the pattern illustrated by the architecture of block diagram 700 of FIG. 7 and may be desirable for a customer of the IaaS provider if the IaaS provider cannot directly communicate with the customer (e.g., a disconnected region). The respective containers 867(1)-(N) that are contained in the VMs 866(1)-(N) for each customer can be accessed in real-time by the customer. The containers 867(1)-(N) may be configured to make calls to respective secondary VNICs 872(1)-(N) contained in app subnet(s) 826 of the data plane app tier 846 that can be contained in the container egress VCN 868. The secondary VNICs 872(1)-(N) can transmit the calls to the NAT gateway 838 that may transmit the calls to public Internet 854. In this example, the containers 867(1)-(N) that can be accessed in real-time by the customer can be isolated from the control plane VCN 816 and can be isolated from other entities contained in the data plane VCN 818. The containers 867(1)-(N) may also be isolated from resources from other customers.

In other examples, the customer can use the containers 867(1)-(N) to call cloud services 856. In this example, the customer may run code in the containers 867(1)-(N) that requests a service from cloud services 856. The containers 867(1)-(N) can transmit this request to the secondary VNICs 872(1)-(N) that can transmit the request to the NAT gateway that can transmit the request to public Internet 854. Public Internet 854 can transmit the request to LB subnet(s) 822 contained in the control plane VCN 816 via the Internet gateway 834. In response to determining the request is valid, the LB subnet(s) can transmit the request to app subnet(s) 826 that can transmit the request to cloud services 856 via the service gateway 836.

It should be appreciated that IaaS architectures 500, 600, 700, 800 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 9:
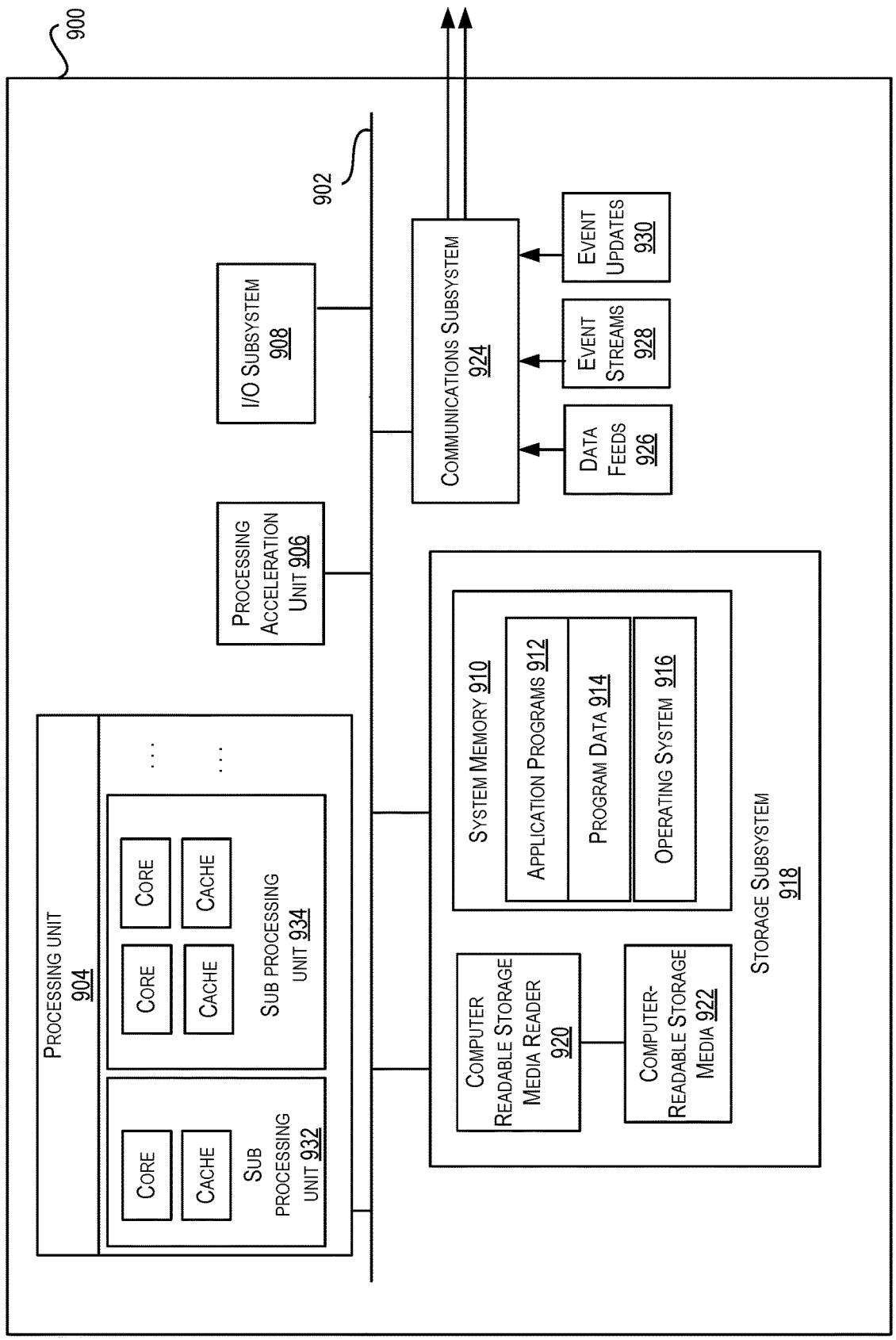
FIG. 9 is a block diagram illustrating an example computer system, according to at least one embodiment.

FIG. 9 illustrates an example computer system 900, in which various embodiments may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present disclosure.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   receiving, by a build system, a list of inputs for performing a build;
   identifying, by the build system, based at least in part on the list of inputs, at least one additional input for performing the build;
   transmitting, by the build system, a request to establish connection to a network endpoint associated with the additional input;
   determining, by the build system, that the connection to the network endpoint associated with the additional input is successful;
   responsive to determining that the connection to the network endpoint associated with the additional input is successful, determining, by the build system, that the additional input can be trusted;
   responsive to determining that the additional input can be trusted, adding, by the build system, the additional input to the list of inputs for performing the build; and
   using, by the build system, the additional input to perform the build.

2. The method of claim 1, wherein the at least one additional input is not specified in the list of inputs for performing the build.

3. The method of claim 1, wherein the additional input represents at least one of an additional input component or an input component dependency used by the build system for performing the build.

4. The method of claim 1, wherein the additional input resides in a trusted repository located within a network trust boundary associated with the build system.

5. The method of claim 1, wherein the additional input resides in an untrusted repository located outside a network trust boundary associated with the build system.

6. The method of claim 1, further comprising, responsive to determining that the additional input can be trusted, replicating, by the build system, content associated with the additional input in a local data store associated with the build system, wherein the local data store resides within a network trust boundary associated with the build system.

7. The method of claim 1, further comprising:
   determining, by the build system, that the network endpoint associated with the additional input resides outside a network trust boundary associated with the build system;
   based on determining that the network endpoint resides outside the network trust boundary, applying, by the build system, a plurality of rules to determine that a repository that stores the additional input resides in is trustworthy; and
   based at least in part on determining that the repository is trustworthy, determining, by the build system, that the additional input can be trusted.

8. The method of claim 1, wherein determining, by the build system, that the additional input can be trusted comprises:
  determining, by the build system, that the network endpoint associated with the additional input resides inside a network trust boundary associated with the build system; and
  responsive to the determining that the network endpoint resides inside the network trust boundary, determining, by the build system that the additional input can be trusted.

9. The method of claim 1, further comprising, adding, by the build system, information identifying at least one of an additional input identifier, an additional input name, a dependency relationship of the additional input with one or more input component dependencies associated with the additional input and a name of the repository that stores the additional input to the list of inputs for performing the build.

10. The method of claim 1, further comprising generating, by the build system, a target build artifact as a result of executing the build.

11. The method of claim 1, further comprising:
  determining, by the build system, that the connection to the network endpoint associated with the additional input is unsuccessful; and
  responsive to the determining, blocking, by the build system, network traffic to the network endpoint.

12. The method of claim 1, further comprising:
  re-executing, by the build system, the build based at least in part on the list of inputs and the at least one additional input used to perform the build;
  generating, by the build system, a target build artifact as a result of re-execution of the build; and
  deploying, by the build system, the target build artifact to production.

13. The method of claim 12, wherein the build system comprises a build container for performing the build and a build proxy server for monitoring network communications to and from the build container, and wherein identifying the at least one additional input for performing the build is based at least in part on the monitoring, by the build proxy server, the network communications to and from the build container.

14. The method of claim 1, further comprising prior to the re-executing:
  determining, by the build system, that content associated with the at least one additional input used to perform the build has changed; and
  responsive to determining that the content has changed, stopping, by the build system, the re-execution of the build.

15. The system of claim 1, wherein the at least one additional input is not specified in the list of inputs for performing the build.

16. The system of claim 1, further comprising:
  responsive to determining that the additional input can be trusted, replicating content associated with the additional input in a local data store associated with the build system, wherein the local data store resides within a network trust boundary associated with the build system.

17. A build system comprising:
a memory; and
one or more processors configured to perform processing, the processing comprising:
  receiving a list of inputs for performing a build;
  identifying, based at least in part on the list of inputs, at least one additional input for performing the build;
  transmitting a request to establish connection to a network endpoint associated with the additional input;
  determining that the connection to the network endpoint associated with the additional input is successful;
  responsive to determining that the connection to the network endpoint associated with the additional input is successful, determining that the additional input can be trusted;
  responsive to determining that the additional input can be trusted, adding the additional input to the list of inputs for performing the build; and
  using the additional input to perform the build.

18. A non-transitory computer-readable medium storing instructions executable by a computer system that, when executed by one or more processors of the computer system, cause the one or more processors to perform operations comprising:
  receiving a list of inputs for performing a build;
  identifying, based at least in part on the list of inputs, at least one additional input for performing the build;
  transmitting a request to establish connection to a network endpoint associated with the additional input;
  determining that the connection to the network endpoint associated with the additional input is successful;
  responsive to determining that the connection to the network endpoint associated with the additional input is successful, determining that the additional input can be trusted;
  responsive to determining that the additional input can be trusted, adding the additional input to the list of inputs for performing the build; and
  using the additional input to perform the build.

19. The non-transitory computer-readable medium of claim 18, wherein the additional input represents at least one of an additional input component or an input component dependency used by the build system for performing the build.

20. The non-transitory computer-readable medium of claim 18, wherein the additional input resides in an untrusted repository located outside a network trust boundary associated with the build system.

* * * * *